US009830052B2

(12) United States Patent
Seo et al.

(10) Patent No.: US 9,830,052 B2
(45) Date of Patent: Nov. 28, 2017

(54) METHOD OF DISPLAYING DATA IN DISPLAY DEVICE USING MOBILE COMMUNICATION TERMINAL, THE DISPLAY DEVICE, AND THE MOBILE COMMUNICATION TERMINAL

(71) Applicant: Samsung Electronics Co. Ltd., Suwon-si, Gyeonggi-do (KR)

(72) Inventors: Suck-Ho Seo, Suwon-si (KR); Gi-Beom Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 178 days.

(21) Appl. No.: 14/027,884

(22) Filed: Sep. 16, 2013

(65) Prior Publication Data

US 2014/0089847 A1   Mar. 27, 2014

(30) Foreign Application Priority Data

Sep. 21, 2012  (KR) ......................... 10-2012-0105143

(51) Int. Cl.
| | | |
|---|---|---|
| *G06F 3/048* | (2013.01) | |
| *G06F 3/0484* | (2013.01) | |
| *G06F 3/0488* | (2013.01) | |
| *G06F 3/14* | (2006.01) | |
| *H04M 1/725* | (2006.01) | |

(52) U.S. Cl.
CPC .......... *G06F 3/0484* (2013.01); *G06F 3/0488* (2013.01); *G06F 3/04842* (2013.01); *G06F 3/1454* (2013.01); *G06F 2203/04806* (2013.01); *G09G 2340/045* (2013.01); *G09G 2370/16* (2013.01); *H04M 1/72527* (2013.01)

(58) Field of Classification Search
CPC ............ G06F 3/0484; G09G 2340/045; G09G 2370/16
See application file for complete search history.

(56) References Cited

U.S. PATENT DOCUMENTS

| | | | |
|---|---|---|---|
| 2008/0065982 A1* | 3/2008 | Evanchik .............. | G06F 3/0483 715/255 |
| 2009/0023475 A1 | 1/2009 | Chang et al. | |
| 2011/0134030 A1* | 6/2011 | Cho ..................... | G06F 3/03547 345/157 |
| 2011/0291964 A1* | 12/2011 | Chambers ............ | G06F 1/1616 345/173 |
| 2011/0302532 A1* | 12/2011 | Missig ................. | G06F 3/0416 715/823 |
| 2011/0304557 A1* | 12/2011 | Wilburn ............... | G06F 3/0488 345/173 |
| 2012/0088548 A1* | 4/2012 | Yun ........................ | G08C 17/02 455/557 |

(Continued)

FOREIGN PATENT DOCUMENTS

WO     2011/077859 A1     6/2011

*Primary Examiner* — Anil Bhargava
(74) *Attorney, Agent, or Firm* — Jefferson IP Law, LLP (57) ABSTRACT

A method of displaying data by a mobile communication terminal mirrored by an external display device is provided. The method includes if a mirroring mode with the external display device is executed, determining whether a first user input for displaying a fixed pointing area is input, if the first user input is input, displaying the pointing area, and transmitting screen data including the pointing area to the external display device in real time.

8 Claims, 8 Drawing Sheets

(56) References Cited

U.S. PATENT DOCUMENTS

| | | | |
|---|---|---|---|
| 2012/0185790 A1* | 7/2012 | Bae | G06F 3/0488 |
| | | | 715/769 |
| 2012/0262492 A1* | 10/2012 | Ohashi | G01C 21/3664 |
| | | | 345/660 |
| 2013/0132867 A1* | 5/2013 | Morris | G06F 3/048 |
| | | | 715/759 |
| 2013/0278484 A1* | 10/2013 | Hwang | G06F 3/1423 |
| | | | 345/2.3 |
| 2014/0009394 A1* | 1/2014 | Lee | H04N 5/4403 |
| | | | 345/157 |

* cited by examiner

METHOD OF DISPLAYING DATA IN DISPLAY DEVICE USING MOBILE COMMUNICATION TERMINAL, THE DISPLAY DEVICE, AND THE MOBILE COMMUNICATION TERMINAL

PRIORITY

This application claims the benefit under 35 U.S.C. §119 (a) of a Korean patent application filed on Sep. 21, 2012 in the Korean Intellectual Property Office and assigned Serial No. 10-2012-0105143, the entire disclosure of which is hereby incorporated by reference.

BACKGROUND OF THE INVENTION

1. Field of the Invention

The present invention relates to a method and an apparatus for displaying data in a display device using a mobile communication terminal. More particularly, the present invention relates to a method of displaying data in a display device using a mobile communication terminal which fixes a pointing area for selecting selection contents, enters the selection contents into the fixed pointing area by moving only screen data, and selects the selection contents, the display device, and the mobile communication terminal.

2. Description of the Related Art

WiFi display refers to a technology that enables the transmitting of data stored in a particular device through a WiFi communication scheme to another device and then displaying the data on the other device. For example, with the installation of a WiFi display function on a mobile communication terminal, a screen that is displayed on the mobile communication terminal may be transmitted to and displayed on a larger screen of another device, such as a TV.

However, it is not easy for a user to control the large screen mirrored from the screen of the mobile communication terminal. For example, if the user desires to perform a movement or a zoom-in/out operation in a top, bottom, left, or right direction, the user must alternately look at the screen of the mobile communication terminal and the large screen. Accordingly, the user may not move the large screen in a desired direction or zoom-in/out an unintended part.

Therefore, there is a need for an improved apparatus and method for displaying data in a display device using a mobile communication terminal.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for displaying data of a display device using a mobile communication terminal which fixes a pointing area for selecting selection contents, enters the selection contents into the fixed pointing area by moving only screen data, and selects the selection contents, the display device, and the mobile communication terminal.

In accordance with an aspect of the present invention, a method of displaying data by a mobile communication terminal on an external display device is provided. The method includes, if a mirroring mode with the external display device is executed, determining whether a first user input for displaying a fixed pointing area is input, if the first user input is input, displaying the pointing area, and transmitting screen data including the pointing area to the external display device in real time.

In accordance with another aspect of the present invention, a mobile communication terminal mirrored by an external display device is provided. The mobile communication terminal includes, a controller configured to determine whether a first user input for displaying a fixed pointing area is input if a mirroring mode with the external display device is executed, a display unit configured to display the pointing area if the first user input is input, and a communication interface configured to transmit screen data including the pointing area to the external display device in real time.

In accordance with another aspect of the present invention, a display system is provided. The display system includes a display device configured to receive screen data in real time, and display the received screen data, and a mobile communication terminal configured to, if a mirroring mode with the display device is executed, determine whether a first user input for displaying a fixed pointing area is input, display the pointing area if the first user input is input, generate screen data including the pointing area, and transmit the generated screen data to the display device in real time, the mobile communication terminal being mirrored by the display device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
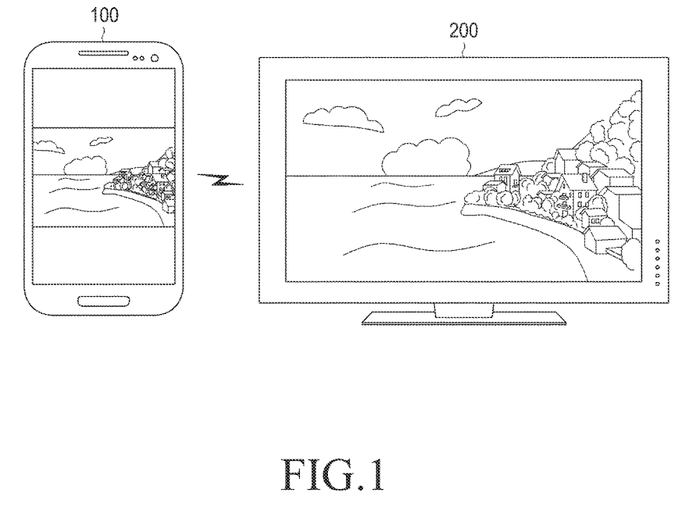
FIG. 1 is a diagram illustrating a display system according to an exemplary embodiment of the present invention.

FIG. 1 is a diagram illustrating a display system according to an exemplary embodiment of the present invention.

Referring to FIG. 1, the display system includes a mobile communication terminal 100 and a display device 200.

The mobile communication terminal 100 transmits various data displayed on a first display unit to the display device 200. As an example, the mobile communication terminal 100 may transmit data in real time through various wireless communication schemes. According to an exemplary embodiment, the mobile communication terminal 100 may convert the various data displayed on the first display unit according to a resolution of the display device 200 and transmit the converted data to the display device 200.

The display device 200 receives data stored in the mobile communication terminal 100 from the mobile communication terminal 100 and displays the received data. For example, the display device 200 may receive data in real time through the various wireless communication schemes. A display unit of the display device 200 can equally display the data that is being displayed on the first display unit of the mobile communication terminal 100. That is, the display unit of the display device 200 can mirror the data.

Hereinafter, a mode in which the display device 200 receives and displays, in real time, the various data that is being displayed on the first display unit of the mobile communication terminal 100 as described above is referred to as a "mirroring mode".

Figure 2:
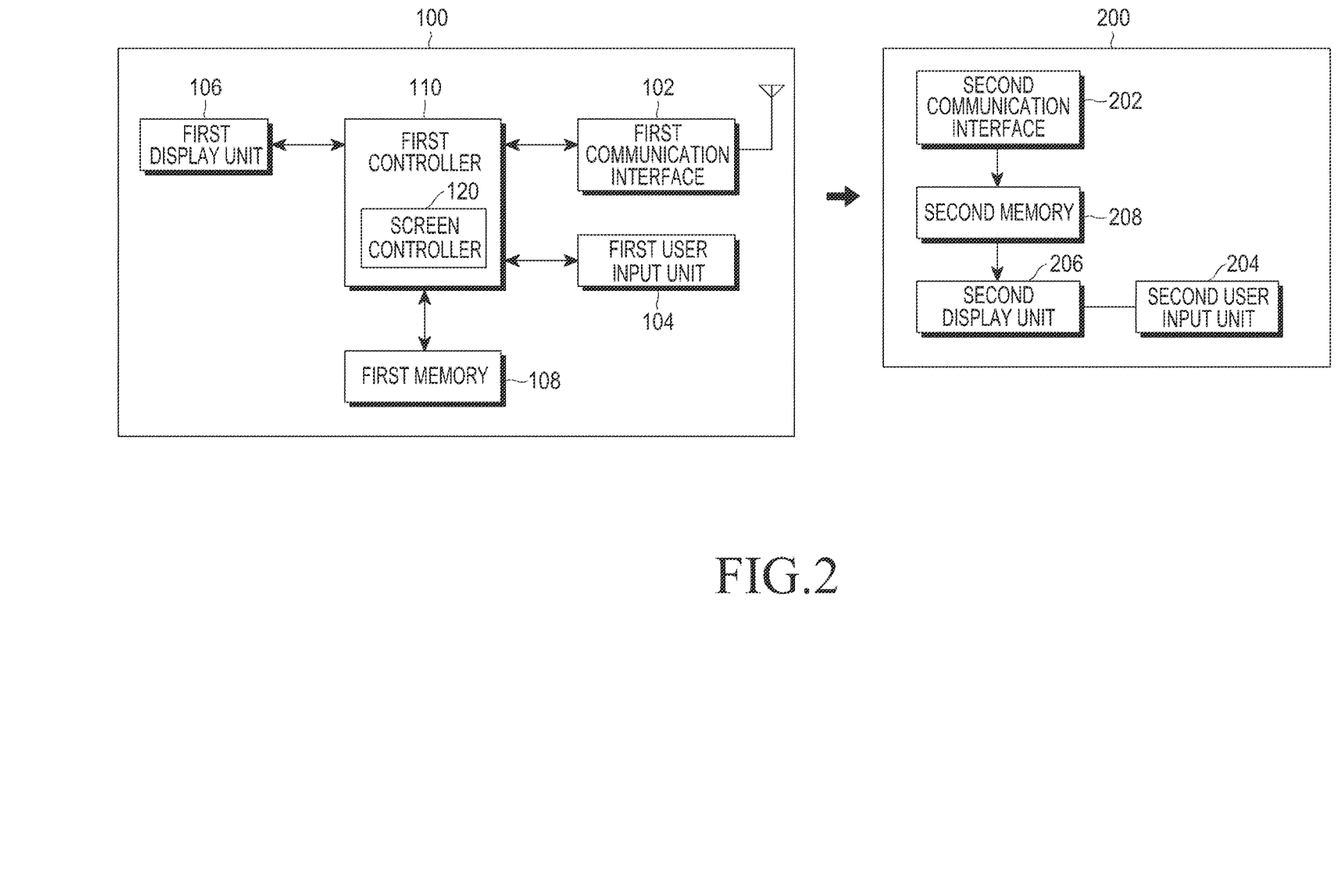
FIG. 2 is a block diagram illustrating a configuration of a mobile communication terminal and a display device according to an exemplary embodiment of the present invention.

FIG. 2 is a block diagram illustrating a configuration of a mobile communication terminal and a display device according to an exemplary embodiment of the present invention.

Referring to FIG. 2, the mobile communication terminal 100 includes a first communication interface 102, a first user input unit 104, a first display unit 106, a first memory 108, and a first controller 110. The first controller 110 includes a screen controller 120.

The first communication interface 102 performs wired or wireless communication of the mobile communication terminal 100. The communication interface 102 can transmit data stored in the memory 108, for example, screen data to the display device 200 through near field communication, such as WiFi, Digital Living Network Alliance (DLNA), Bluetooth, and the like.

Herein, the term "screen data" refers to various data that is being displayed on the first display unit 106 of the mobile communication terminal 100 when the display device 200 mirrors the mobile communication terminal 100, that is, in the mirroring mode.

The first user input unit 104 receives e.g., data, a signal, etc. input by a user. According to the exemplary embodiment, the first user input unit 104 can receive a user input for mirroring a screen displayed on the first display unit 106 to the display device 200, that is, a user input for executing the mirroring mode. Further, the first user input unit 104 can receive a user input for selecting data that is being displayed on the first display unit 106.

The first display unit 106 displays various data stored in the mobile communication terminal 100. The first display unit 106 may be implemented by a touch screen to receive a touch input from the user. That is, the first display unit 106 may be a touch input, which can receive a user input for moving the screen displayed on the display device 200 in a top, bottom, left, or right direction or for zooming-in/out the screen.

In an exemplary implementation, the user input may be variously set by the user using the mobile communication terminal 100 and the set user input may be stored in the first memory 108. For example, the user can input the user input for selecting selection contents in a pointing area into the mobile communication terminal 100 by pressing the touch screen for a pre-stored reference time or more.

The first memory 108 stores various data for controlling the mobile communication terminal 100. For example, the first memory 108 can store various data displayed on the first display unit 106, user inputs input through the first user input unit 104 or the first display unit 106, commands corresponding to the respective user inputs, and the like. Further, the first memory 108 can store screen data.

The first controller 110 controls general operations of the mobile communication terminal 100. The first controller 110 may include the screen controller 120 for generating the screen data to be transmitted to the display device 200.

When the user input for executing the mirroring mode is received from the first user input unit 104, the screen controller 120 of the first controller 110 converts various data currently displayed on the first display unit 106 to data suitable for being displayed on the display device 200. In an exemplary implementation, the screen controller 120 can generate the screen data having a resolution of the display device 200.

Further, when the user input for executing the mirroring mode is received, the first controller 110 controls the first communication interface 102 to make a request for executing the mirroring mode to the display device 200. In addition, the first controller 110 can control the first communication interface 102 to send a request for information containing the resolution of the display device 200 to the display device 200 and receive the information.

When the mirroring mode is executed, the first controller 110 controls the first communication interface 102 to transmit data, for example, the screen data, to the display device 200. The screen data may include all data currently displayed on the first display unit 106 (e.g., contents such as an icon, an image, a text and the like. Also, the screen data may further comprise various commands corresponding to the contents. Accordingly, the various commands corresponding to the contents may be transmitted to the display device 200.

Further, the first controller 110 determines whether a user input for selecting one of the contents included in the screen data is input through the first user input unit 104 or the first display unit 106. Hereinafter, among the contents included in the screen data, contents entering a pointing area by the user input are referred to as "selection contents".

For example, when a touch input for enlarging the screen is input through the first display unit 106, the first controller 110 can determine the touch input as the user input for selecting the selection contents from the screen data.

When the user input for selecting the selection contents from the contents included in the screen data is input, the first controller 110 controls the first display unit 106 to display the pointing area. Accordingly, the point area is included in the screen displayed on the first display unit 106. Further, the screen controller 120 generates the screen data including the pointing area, and the first controller 110 controls the first communication interface 102 to transmit the screen data including the pointing area to the display device 200.

The "pointing area" refers to a particular area displayed on the screen data such that the user can easily select the selection contents from the screen data displayed on the display device 200. In order to make the user selection easier, the pointing area can be displayed on the first display unit 106 and a second display unit 206 in a fixed form all the time.

In an exemplary implementation, the user can move the screen data in a top, bottom, left, or right direction or zoom-in/out the screen data to enter the selection contents of the screen data into the pointing area while viewing the screen displayed on the display device 200. For example, it is assumed that the user desires to select contents A from the screen data displayed on the display device 200. The user puts the contents A into the pointing area by moving or zooming-in/out the screen data displayed on the first display unit 106 of the mobile communication terminal 100. At this time, since the screen data including the pointing area is displayed on the second display unit 206 of the display device 200 in the same manner as on the first display unit 106 of the mobile communication terminal 100, the user can easily move the contents A into the pointing area while looking at only the second display unit 206 of the display device 200.

When the selection contents of the screen data enter the pointing area, the first controller 110 determines whether the user input for executing an operation corresponding to the selection contents is received. When the user input for executing the operation (hereinafter, a selection operation) corresponding to the selection contents is received, the first controller 110 controls the mobile communication terminal 100 to execute the selection operation. Accordingly, screen data, of which the selection operation is executed by the mobile communication terminal 100, is transmitted to the display device 200 by the mobile communication terminal 100, and the selection operation is displayed as if it were being executed on the display device 200, so that the user can identify the executed operation by looking at only the second display unit 206 of the display device 200.

At this time, the user input for executing the selection operation may be input through the first user input unit 104 of the mobile communication terminal 100 or the first display unit 106 that is implemented in a form of a touch screen. In an exemplary implementation, the touch input for executing the selection operation may be generated in another area other than the pointing area. That is, once the touch is generated by the user in any part of the touch screen, the first controller 110 can execute the selection operation. For example, it is assumed that the contents A enter the pointing area located in the center of the screen data and the user performs the touch input in a right lower side of the touch screen successively two times. When the touch input of successively touching the touch screen two times is the user input for executing the selection operation corresponding to the selection contents, the first controller 120 controls the mobile communication terminal 100 to execute the selection operation regardless of a point where the touch input is received.

In an exemplary implementation, when the user input for executing the selection operation is received, the first controller 110 can control the first display unit 106 not to display the pointing area. Further, the screen controller 120 generates the screen data that does not include the pointing area, and the first controller 110 controls the first communication interface 102 to transmit the screen data that does not include the pointing area to the display device 200.

Referring to FIG. 2, the display device 200 includes a second communication interface 202 and a second display unit 206, and may further include a second user input unit 204 and a second memory 208.

The second communication interface 202 performs wired or wireless communication of the display device 200. The second communication interface 202 can receive data, for example, the screen data from the mobile communication terminal 100 through the near field communication scheme.

The second display unit 206 displays various data stored in the display device 200 and displays data received through the second communication interface 202, for example, the screen data. When the mirroring mode between the mobile communication terminal 100 and the display device 200 is executed, the second display unit 206 displays the screen data transmitted in real time from the mobile communication terminal 100. That is, the first display unit 106 of the mobile communication terminal 100 and the second display unit 206 of the display device 200 display the same screen.

The second user input unit 204 receives the user input by the user. The second user input unit 204 according to the exemplary embodiment can receive the user input for executing the mirroring mode between the mobile communication terminal 100 and the display device 200.

The second memory 208 stores various data for controlling the display device 200 and can store screen data received from the mobile communication terminal 100.

Figure 3:
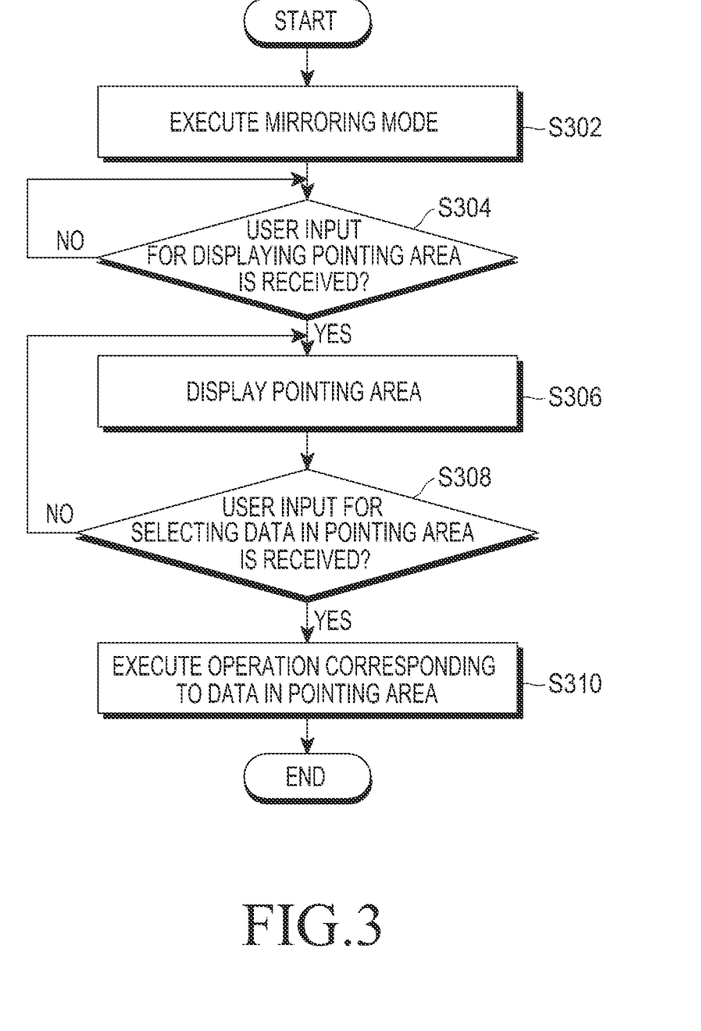
FIG. 3 is a flowchart illustrating a method of displaying data of a mobile communication terminal according to an exemplary embodiment of the present invention.

FIG. 3 is a flowchart illustrating a method of displaying data of a mobile communication terminal according to an exemplary embodiment of the present invention.

Referring to FIG. 3, the mobile communication terminal 100 executes the mirroring mode in step S302. When the mirroring mode is executed, the screen controller 120 of the mobile communication terminal 100 generates screen data and the first communication interface 102 transmits the screen data to the display device 200 in real time.

The first controller 102 of the mobile communication terminal 100 determines whether the user input for performing a display including the pointing area is received in step S304. If it is determined in step S304 that the user input for displaying the pointing area is not received, the first controller 110 of the mobile communication terminal 100 does not perform any operation.

On the other hand, if it is determined in step S304 that the user input for displaying the pointing area is received, the first display unit 106 of the mobile communication terminal 100 displays such that the pointing area is included in the screen data in step S306. Since the mirroring mode is executed, the screen data including the pointing area can be displayed on both the mobile communication terminal 100 and the display device 200.

The first controller 102 determines whether the user input for selecting data in the pointing area, that is, selection contents, is received in step S308.

If it is determined in step S308 that the user input for selecting the selection contents is not received, the first controller 110 controls the first display unit 106 to continuously display the pointing area. On the other hand, if it is determined in step S308 that the user input for selecting the selection contents is received, the first controller 110 executes a selection operation that is an operation corresponding to the data in the pointing area, that is, the selection contents in step S310.

When the selection operation is executed by the mobile communication terminal 100 in step S310, since the same screen as the screen displayed on the first display unit 106 is displayed on the display device 200 according to the execution of the selection operation, the user can identify the selection operation through the display device 200.

Figure 4:
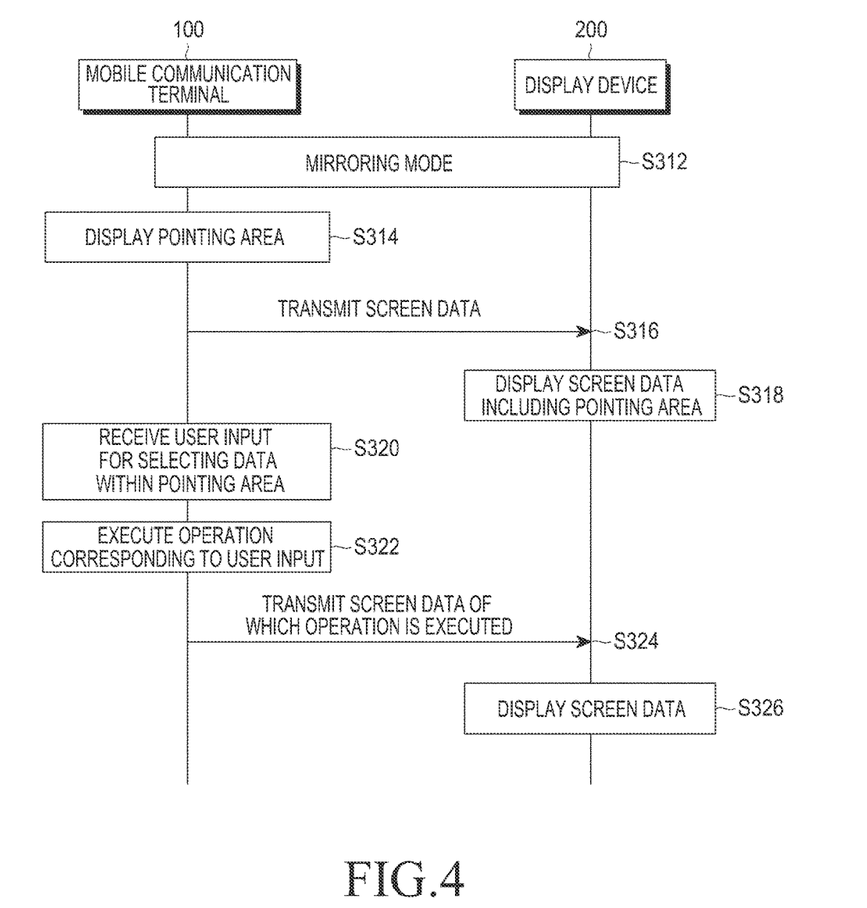
FIG. 4 is a flowchart illustrating a method of displaying data of a mobile communication terminal and a display device according to an exemplary embodiment of the present invention.

FIG. 4 is a flowchart illustrating a method of displaying data of a mobile communication terminal and a display device according to an exemplary embodiment of the present invention.

Referring to FIG. 4, the mobile communication terminal 100 and the display device 200 execute the mirroring mode in step S312. As described in FIG. 3, when the mirroring mode is executed, the screen controller 120 of the mobile communication terminal 100 generates the screen data and the first communication interface 102 transmits the screen data to the display device 200 in real time. Further, the display device 200 receives the screen data transmitted in real time from the mobile communication terminal 100 and displays the received screen data in real time.

When the user input for displaying the pointing area is received, the mobile communication terminal 100 displays the pointing area in step S314. Further, the mobile communication terminal 100 transmits the screen data including the pointing area in step S316, and the display device 200 displays the screen data including the pointing area through the second display unit 206 in step S318.

When the user input for selecting data within the pointing area, that is, selection contents, is received in step S320, the mobile communication terminal 100 executes an operation corresponding to the user input, that is, a selection operation in step S322. Further, the mobile communication terminal 100 transmits the screen data that corresponds to a screen in which the selection operation is executed to the display device 200 in step S324. Accordingly, the display device 200 displays the screen data in which the selection operation is executed in step S326.

In the following description of FIGS. 5A to 5D, it is assumed that the mobile communication terminal 100 and the display device 200 are both in the mirroring mode.

Figure 5A:
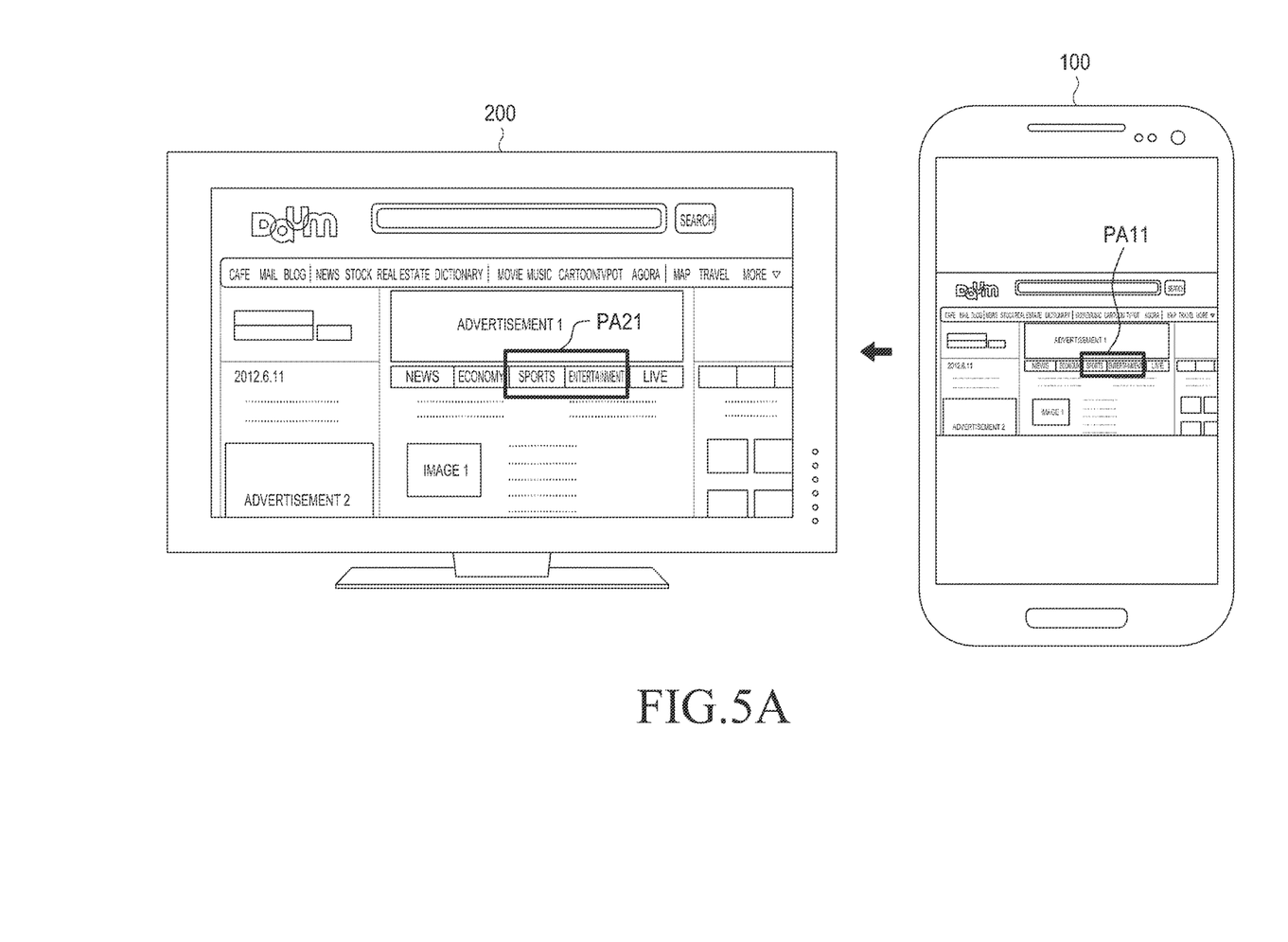
FIG. 5A illustrates a mobile communication terminal and a display device that display the same screen data based on the mirroring mode according to an exemplary embodiment of the present invention.

FIG. 5A illustrates a mobile communication terminal and a display device that display the same screen data based on the mirroring mode according to an exemplary embodiment of the present invention.

Referring to FIG. 5A, a pointing area PA11 is displayed on the mobile communication terminal 100, so that a pointing area PA21 is displayed on the display device 200. Since the display device 200 mirrors the mobile communication terminal 100, the mobile communication terminal 100 and the display device 200 display the pointing areas PA11 and PA21 in the same positions. Further, selection contents within the pointing areas PA11 and PA21 are also the same between the mobile communication terminal 100 and the display device 200.

Figure 5B:
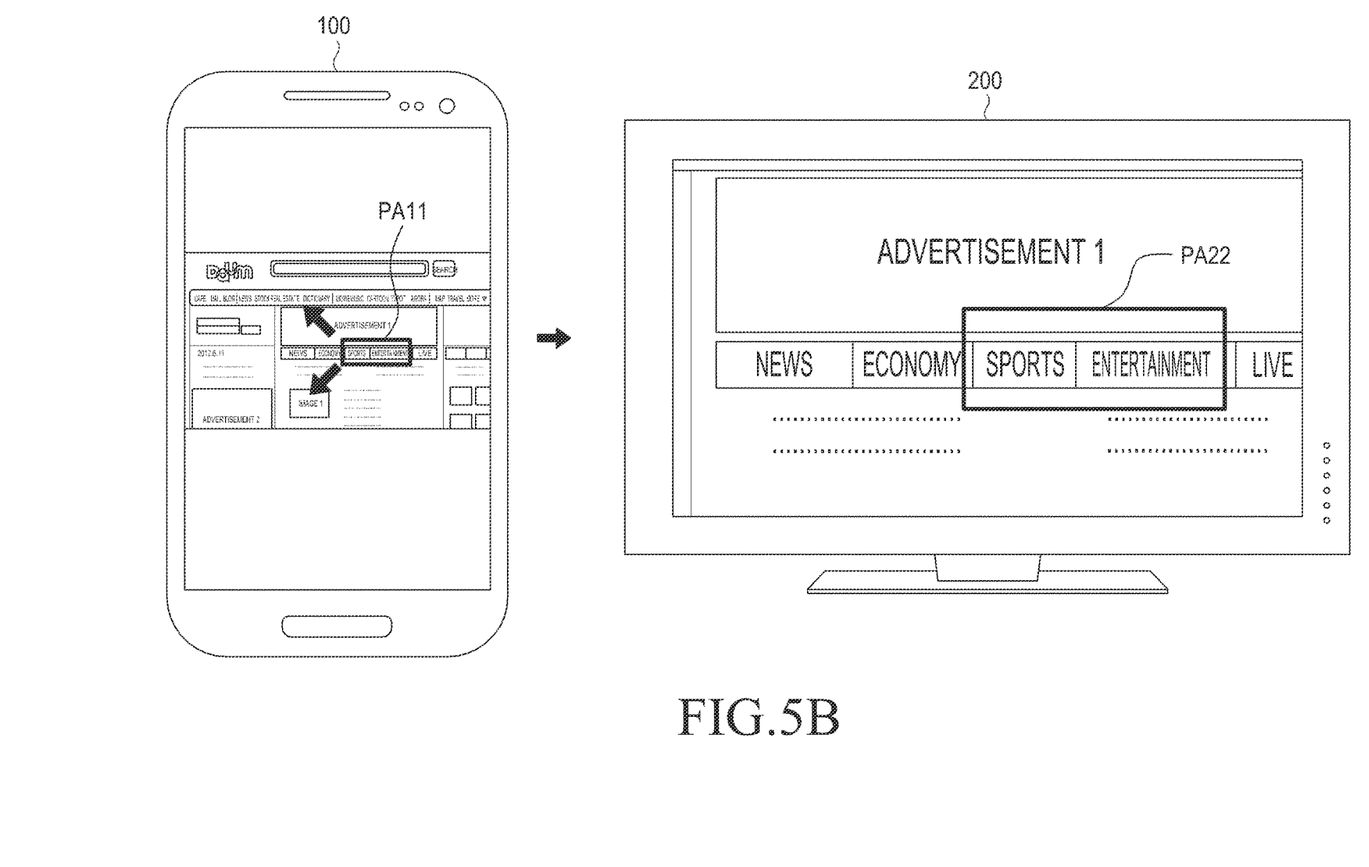
FIG. 5B illustrates a mobile communication terminal receiving a touch input for zooming-in screen data and a display device displaying the zoomed-in screen data according to the touch input according to an exemplary embodiment of the present invention.

FIG. 5B illustrates a mobile communication terminal receiving a touch input for zooming-in screen data and a display device displaying the zoomed-in screen data according to the touch input according to an exemplary embodiment of the present invention.

Referring to FIG. 5B, the user using the mobile communication terminal 100 inputs a touch input of pushing an upper left part and a lower left part of the pointing area PA12 to a left side into the mobile communication terminal 100. The touch input is a touch input for zooming-in the screen data. Accordingly, the screen data that is being displayed on the display device 200 is also zoomed-in. The display device 200 includes a pointing area PA22 and displays the zoomed-in screen data.

Figure 5C:
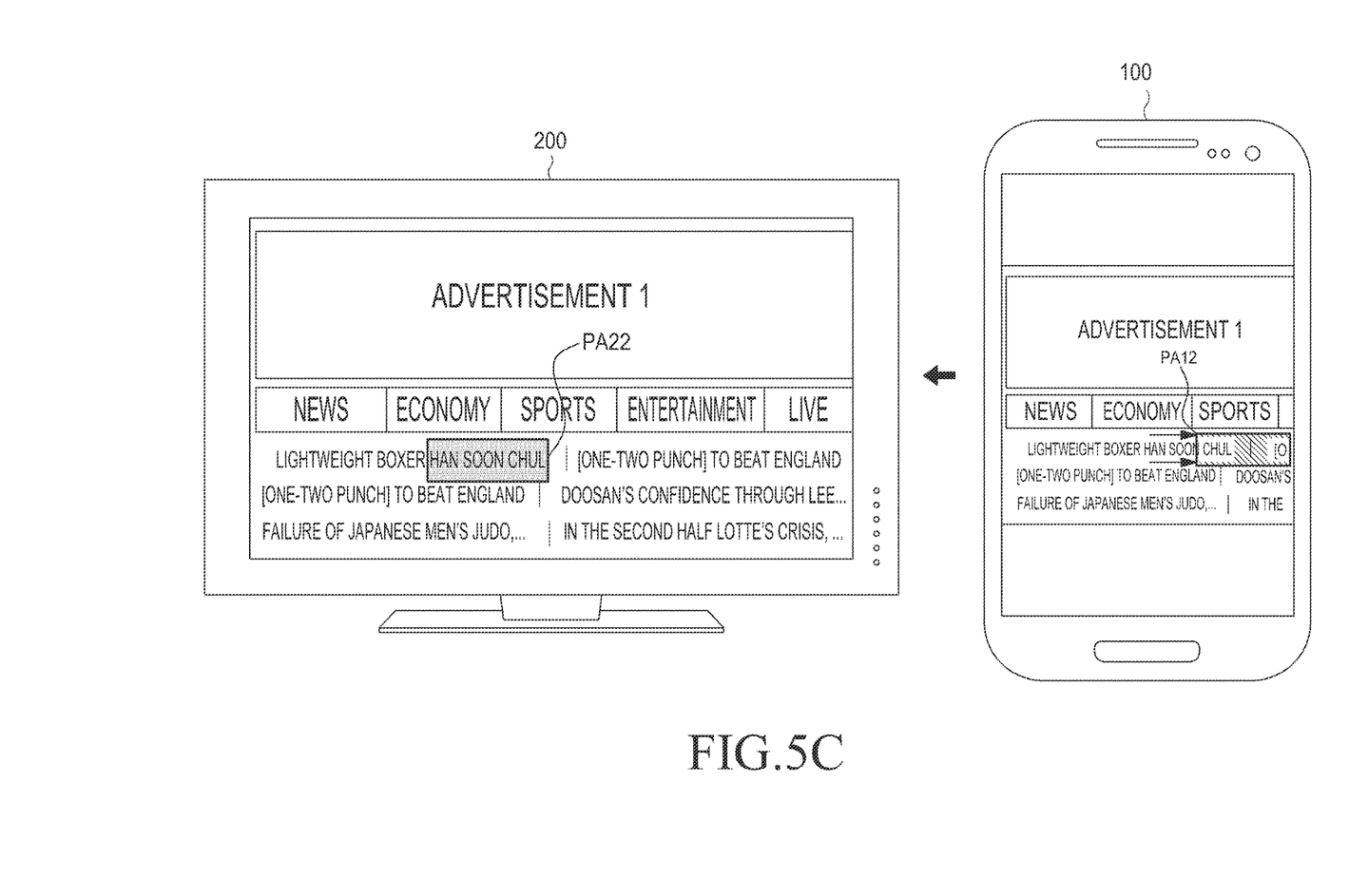
FIG. 5C illustrates a mobile communication terminal receiving a touch input of moving screen data to a left side and a display device displaying the screen data moved to the left side according to the touch input according to an exemplary embodiment of the present invention.

FIG. 5C illustrates a mobile communication terminal receiving a touch input of moving screen data to a left side and a display device displaying the screen data moved to the left side according to the touch input according to an exemplary embodiment of the present invention.

Referring to FIG. 5C, the user inputs a touch input of moving the screen data of the mobile communication terminal 100 from a left side to a right side. According to the touch input, the mobile communication terminal 100 moves the screen data except for the pointing area PA12 from the left side to the right side. The display device 200 also moves the screen data except for the pointing area PA22 from the left side to the right side and then displays the moved screen data.

Figure 5D:
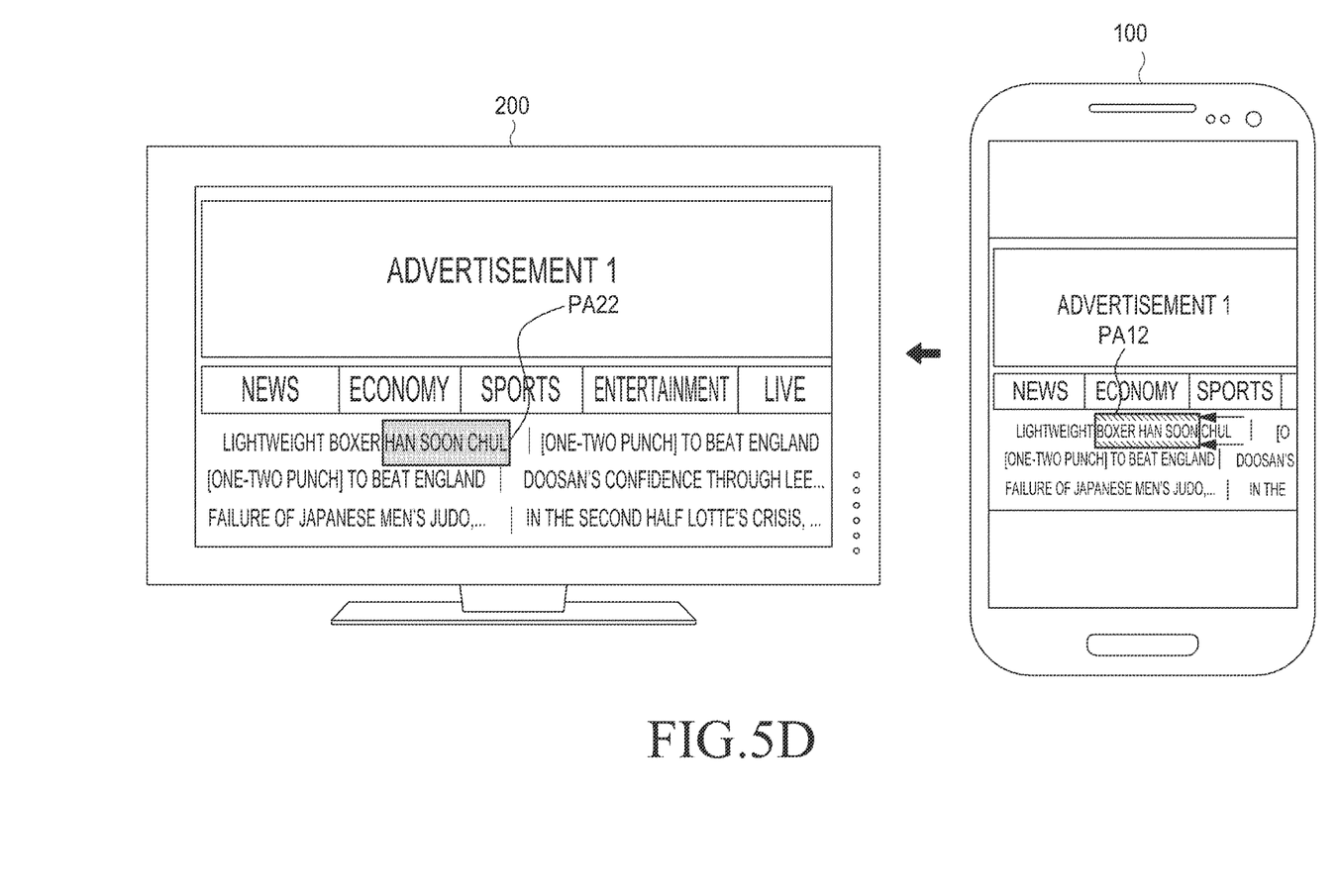
FIG. 5D illustrates a mobile communication terminal receiving a touch input of moving screen data to a right side and a display device displaying the screen data moved to the right side according to the touch input according to an exemplary embodiment of the present invention.

FIG. 5D illustrates a mobile communication terminal receiving a touch input of moving screen data to a right side and a display device displaying the screen data moved to the right side according to the touch input according to an exemplary embodiment of the present invention.

Referring to FIG. 5D, the user inputs a touch input for moving the screen data of the mobile communication terminal 100 from a right side to a left side. According to the touch input, the mobile communication terminal 100 moves the screen data except for the pointing area PA12 from the right side to the left side. The display device 200 also moves the screen data except for the pointing area PA22 from the right side to the left side and then displays the moved screen data. Accordingly, the selection contents within the pointing area of the display device 200 can be changed to "HAN SOON CHUL" from "CHULI[O".

As described above, the user using the mobile communication terminal 100 according to exemplary embodiments of the present invention allows the selection contents that the user desires to enter the fixed pointing area by moving the remaining screen data except for the pointing area.

As described above, exemplary embodiments of the present invention provide a method for displaying data of the display device using the mobile communication terminal, the display device, and the mobile communication terminal that fix the pointing area for selecting selection contents, enter only the selection contents into the fixed pointing area by moving only the screen data, and select the selection contents.

Further, exemplary embodiments of the present invention allow the user to easily input the user input for easily selecting the selection contents from the screen data through the screen of the display device, by moving only the screen data except for the fixed pointing area in a top, bottom, left, or right direction or zooming-in/out the screen data.

It may be appreciated that the exemplary embodiments of the present invention can be implemented in software, hardware, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement exemplary embodiments of the present invention. Therefore, exemplary embodiments of the present invention provide a program including codes for implementing a system or method claimed in any claim of the accompanying claims and a machine-readable device for storing such a program. Further, this program may be electronically conveyed through any medium such as a communication signal transferred via a wired or wireless connection, and exemplary embodiments of the present invention appropriately include equivalents thereto.

Further, the mobile communication terminal according to exemplary embodiments of the present invention can receive the program from a program providing apparatus connected to the mobile communication terminal wirelessly or through a wire and store the received program. The program providing apparatus may include a memory for storing a program containing instructions for allowing the mobile communication terminal to perform a preset content protecting method and information required for the content protecting method, a communication unit for performing wired or wireless communication with the mobile communication terminal, and a controller for transmitting the corresponding program to the mobile communication terminal according to a request of the mobile communication terminal or automatically.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for displaying data on a second device that is mirrored by a first device, the method comprising:
    while in a mirrored mode with the second device, transmitting, by a communication interface of the first device, a first screen and a pointing area displayed on the first screen, wherein the pointing area is fixed on the first screen;
    when a first input for selecting a first content corresponding to the pointing area is inputted to the first device, generating, by a processor of the first device, a second screen by executing a first command based on the first content and transmitting the second screen to the second device, wherein the first content includes one or more images or text within the pointing area from among the first screen; and
    when a second input for changing the first screen is inputted to the first device, generating, by the processor, a third screen by moving the first screen and transmitting the third screen to the second device.

2. The method of claim 1, further comprising, when the first input is inputted, enlarging, by the processor, the first screen.

3. A first device for displaying data on a second device that is mirrored by the first device, comprising:
    a display;
    a communication interface; and
    a processor configured to:
        while in a mirrored mode with the second device, transmit a first screen and a pointing area displayed on the first screen, wherein the pointing area is fixed on the first screen,
        when a first input for selecting a first content corresponding to the pointing area is inputted to the first device, generate a second screen by executing a first command based on the first content and transmit the second screen to the second device, wherein the first content includes one or more images or text within the pointing area from among the first screen, and
        when a second input for changing the first screen is inputted to the first device, generate a third screen by moving the first screen and transmit the third screen to the second device.

4. The first device of claim 3, wherein the processor is further configured to, when the first input is inputted, enlarge the first screen.

5. The method of claim 1, further comprising:
    when the first input is inputted, controlling, by the processor, the second device to remove the pointing area.

6. The first device of claim 3, wherein the processor is further configured to:
    when a third input for selecting second content corresponding to the pointing area displayed on the third screen is inputted to the first device, generate a fourth screen by executing a command related to the second content, and
    control the communication interface to transmit the fourth screen to the second device.

7. The first device of claim 6, wherein the processor is further configured to:
    when a fourth input for zooming-in or zooming-out the pointing area is inputted to the first device, control the second device to zoom-in or zoom-out the first content and the pointing area.

8. The first device of claim 3, wherein the processor is further configured to:
    when the first input is inputted, control the second device to remove the pointing area.

* * * * *